Figure 1:
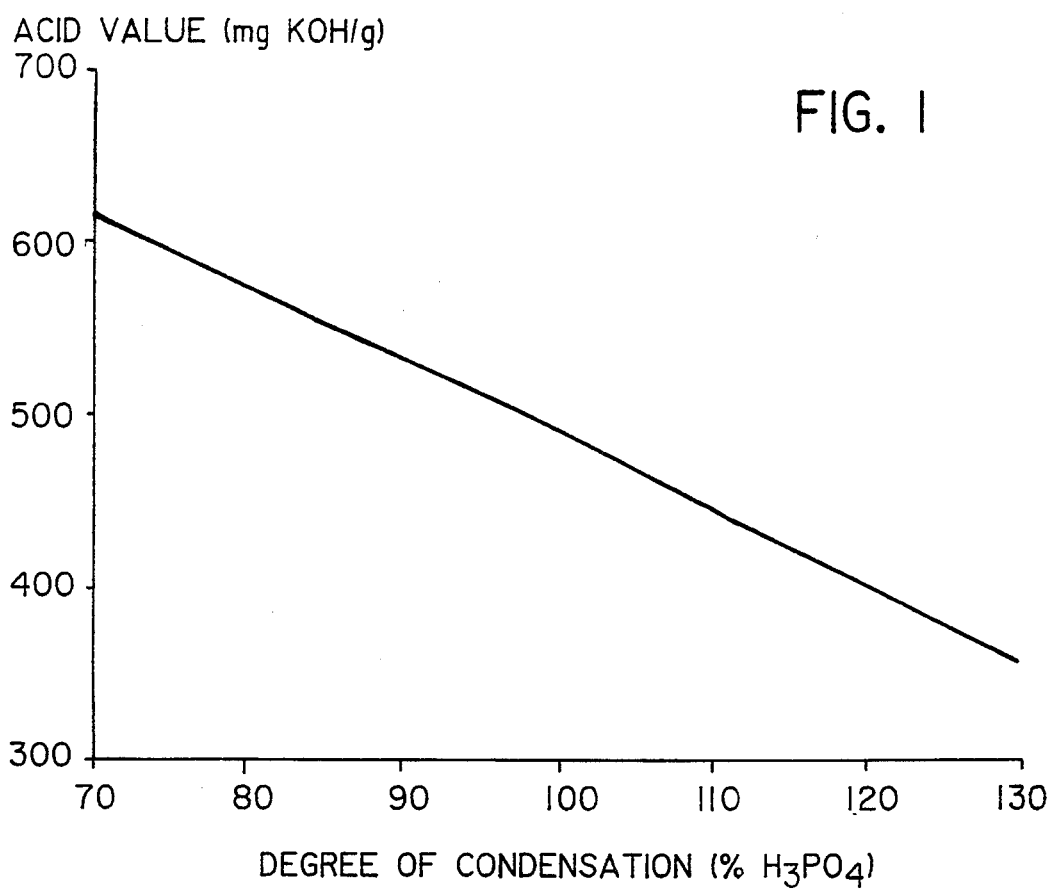

United States Patent [19]

Aslin

[11] Patent Number: 5,387,655
[45] Date of Patent: Feb. 7, 1995

[54] COMPOSITION WITH INTEGRAL INTUMESCENCE PROPERTIES

[75] Inventor: Charles D. Aslin, Belper, Great Britain

[73] Assignees: Chemische Fabrik Budenheim; Rudolf A. Oetker, Budenheim, Germany

[21] Appl. No.: 39,358

[22] PCT Filed: May 26, 1992

[86] PCT No.: PCT/EP92/01186
§ 371 Date: Jul. 28, 1993
§ 102(e) Date: Jul. 28, 1993

[87] PCT Pub. No.: WO93/05118
PCT Pub. Date: Mar. 18, 1993

[30] Foreign Application Priority Data
Sep. 9, 1991 [AT] Austria ............... 1790/91

[51] Int. Cl.⁶ .............................. C08L 61/34
[52] U.S. Cl. ........................... 525/511; 525/472; 525/509; 524/115; 524/116; 524/188; 524/220
[58] Field of Search ............. 525/472, 509, 511; 524/115, 116, 188, 220

[56] References Cited

U.S. PATENT DOCUMENTS

| | | |
|---|---|---|
| 3,422,046 | 1/1969 | Thomas et al. . |
| 3,440,201 | 4/1969 | Sempert et al. . |
| 3,562,197 | 2/1971 | Sears et al. . |
| 4,026,711 | 5/1977 | Weyker et al. . |
| 4,061,695 | 12/1977 | Tai et al. . |
| 4,100,231 | 7/1978 | Tai et al. . |
| 4,210,452 | 7/1980 | Nicholson et al. . |
| 4,256,844 | 3/1981 | Martin et al. . |
| 4,339,357 | 7/1982 | Nicholson et al. . |
| 4,370,442 | 1/1983 | Pearson . |
| 4,442,157 | 4/1984 | Marx et al. . |
| 4,632,946 | 12/1986 | Muench et al. . |
| 4,636,538 | 1/1987 | Malcolm-Brown . |
| 4,645,782 | 2/1987 | Redfarn . |
| 4,774,268 | 9/1988 | Marx et al. . |

FOREIGN PATENT DOCUMENTS

| | | |
|---|---|---|
| 356782 | 5/1980 | Austria . |
| 0012205 | 6/1980 | European Pat. Off. . |
| 0138546 | 4/1985 | European Pat. Off. . |
| 0139401 | 5/1985 | European Pat. Off. . |
| 0449689 | 10/1991 | European Pat. Off. . |
| 2413458 | 7/1979 | France . |
| 1644780 | 4/1971 | Germany . |
| 45-15836 | 6/1970 | Japan . |
| 56-151776 | 11/1981 | Japan . |
| 669793 | 4/1989 | Switzerland . |
| 755551 | 8/1956 | United Kingdom . |
| 812390 | 4/1959 | United Kingdom . |
| 1176684 | 1/1970 | United Kingdom . |
| 2007689 | 5/1979 | United Kingdom . |
| 2012296 | 7/1979 | United Kingdom . |
| 1604908 | 12/1981 | United Kingdom . |
| 2151237 | 7/1985 | United Kingdom . |
| WO86/00915 | 2/1986 | WIPO . |

Primary Examiner—Samuel A. Acquah
Attorney, Agent, or Firm—Oblon, Spivak, McClelland, Maier & Neustadt

[57] ABSTRACT

Described is a composition with integral intumescence properties, the composition being obtained by combining: a) one or more aminoformaldehyde resins and b) a mixture of mono- and di- esters of orthophosphoric acid with one or more polyols, the average hydroxy-group content of the polyols being at least 40% by weight, the molar ratio of mono-ester to di-ester not exceeding 12:1 and the phosphorus content of the mixture being at least 10% by weight.

41 Claims, 1 Drawing Sheet

COMPOSITION WITH INTEGRAL INTUMESCENCE PROPERTIES

The present invention relates to a composition having integrated intumescent properties, particularly to a coating on the basis of mixtures of partial phosphate esters, the preparation thereof and their use for the formation of intumescent films, coatings, etc.

The compositions according to the present invention have applications which extend beyond those of the prior art.

Intumescent coatings are commonly applied to the surface of elements of construction. Such coatings serve, for example, to protect barriers or bulkheads separating compartments or penetrations between compartments against the action of fire. The function of the coating, in this case, is to prevent the passage of fire from one compartment to the other. Intumescent coatings are also applied to the surface of flammable substrates, to reduce the flammability thereof, but also to obtain coatings which protect against other influences or are decorative.

According to the state of the art, intumescent coatings consist of an acid phosphate, a polyhydroxy compound and an expanding agent. These components are bound by a conventional polymeric binder. Said binder may be an acrylic styrene or vinyl toluene copolymer, a styrene or vinyl toluene-butadiene-copolymer or a styrene or vinyltoluene-acrylonitrile-copolymer. Alternatively, polyvinyl alcohol, polyvinyl acetate, polyvinyl butyral, urea or melamine formaldehyde resins and vinyl chloride-vinylidene chloride copolymers are also used. The use of epoxy resins in combination with various amino-functional curing agents is also known., In all of these formulations chlorinated paraffins or optionally chlorinated phosphate esters are contained as plasticizers.

Intumescent fire retarding compositions act by forming an expanded, insulating layer of hardly flammable material which forms under the action of heat and which protects the substrate from the access of oxygen and/or overheating and thereby prevents or delays the inflammation of flammable substrates or prevents or at least delays the change in the mechanical and static properties of supporting elements of construction caused by the action of heat.

The properties of the respective formulations strongly depend on the compositions thereof which therefore require exact adjustment. Thus, for example, a stronger expansion (intumescence) results in a thicker protective layer but at the same time said layer becomes more easily detached from the substrate due to its reduced mechanical stability and thus becomes less effective. Intumescent systems have been known and described for a long time. GB-A-2,151,237 discloses formulations which contain chlorinated polymers, novolak resins and chlorinated of phosphorylated plasticizers. GB-A-2,012,296 describes formulations which contain expandable graphite, hydrated alumina and binder systems on the basis of halogenated elastomers and alkyl phenol-formaldehyde resin. GB-A-1,604,908 mentions products with vermiculite and inorganic fibers as filler as well as elastomeric binders and clay.

Conventional systems consist of a binder of the above type, a char or carbon skeleton forming substance (in the following referred to as "carbonific"), an expanding agent (in the following referred to as "spumific") and an acid forming substance as essential components.

As carbonifics, polyhydroxy compounds such as pentaerythritol, dipentaerythritol, tripentaerythritol, starch and sugars are employed. Examples of spumifics are nitrogen-containing compounds such as melamine, urea, dicyandiamide and guanidine. As acid forming substances mainly ammonium phosphates, preferably ammonium polyphosphate, find use. Examples of further additives are inorganic fibers which are to increase the mechanical strength of the intumescent layer and/or to prevent the dripping thereof, and metal oxides which act as smoke suppressants. Typical examples of such compositions can be found in U.S. Pat. Nos. 4,442,157 and 3,562,197, GB-A-755,551 and EP-A-138,546.

From the literature it can be taken that the individual components are not restricted in their action to one single function. This can be taken from e.g. GB-A-2,007,689 where the reaction product of an amide with an aldehyde compound acts both as carbonific and as spumific. An epoxide resin described in EP-A-139,401 acts both as binder and as spumific. US-A-3,969,291 describes a water-soluble amidopolyphosphate which acts both as acid forming substance and spumific.

The efficiency of such fire protection systems over an extended period of time is limited by the fact that low molecular components contained therein are eliminated therefrom by leaching out, evaporation and other mechanisms. Thus, the efficiency of conventional fire protection formulations after storage or weathering for extended periods of time is doubtful and has to be examined in each individual case by fire tests. To overcome said disadvantage it has been tried to use components with higher molecular weights, such as starch, proteins, polypentaerythritol compounds and epoxy resins as carbonifics and aminoplasts and similar compounds as spumifics.

According to the state of the art conventional phosphate catalyzed intumescent compositions are thus composed of the following substances:

(i) As acid source (catalyst) usually aminophosphates, mainly ammonium polyphosphate, ammonium orthophosphate and melamine phosphate, are used in an amount of about 25% by weight of the total formulation.

(ii) An organic compound, usually a polyol, which is decomposed by the liberated acid to form carbon (carbonification) acts as carbonific. For this purpose usually pentaerythritol, dipentaerythritol, tripentaerythritol, starch or starch derivatives are employed.

(iii) A spumific effects the formation of a foamed (intumescent) layer by emission of an inert gas. Examples of common spumifics are melamine, melamine salts, melamine derivatives and/or dicyan diamide.

The mechanism of action of conventional intumescent systems under the influence of heat can be described in simplified form as follows:

1. At a temperature above 70° C. the binder system softens to form a highly viscous melt.

2. Above about 90° C. the decomposition of spumific and plasticizer with emission of inflammable gases begins, which gases form an inert gas layer above the coating and prevent an inflammation of the flammable organic components of the coating.

3. The acid forming substance releases ammonia above about 150° C., leaving free acid which reduces the viscosity of the melt.

4. The carbonific melts and reacts with the acid released under 3. with release of water and carbonification.

5. The spumific decomposes under emission of inert gas and expands the melt into a soft foam.

At temperatures around 210° C. reactions 3., 4. and 5. occur simultaneously.

6. By partial decomposition the soft foam changes into a relatively rigid layer.

7. The free acid still present reacts with the pigments (metal oxides) present under formation of phosphates.

8. The carbonaceous protective layer is gradually ablated by the fire source, thus reducing the insulating effect. Phosphorus may also be lost from the system if no metal oxides are available for the trapping reaction (7.).

9. Depending on the composition of the residue, phase transitions or melting can occur.

The intumescent coatings acting according to the above reaction scheme show a severe disadvantage which significantly limits their field of application. This disadvantage resides in the fact that said systems are multicomponent systems, the individual components whereof first have to undergo decomposition and transformation reactions in order to form the desired expanded protective layer. Furthermore, the transport and diffusion phenomena leading to a homogeneous reactive melt are the rate determining factor for the total reaction resulting in the formation of the protective layer.

The decomposition reactions of the components each are dependent on the temperature. For each of these reactions there is a minimum temperature above which the decomposition sets in. Even when the reactions resulting in the formation of the expanded protective layer have a low temperature barrier, the reaction sequence will nevertheless only proceed after the decomposition reactions of the components have occurred.

Furthermore, the source of acid most frequently used, i.e., ammonium polyphosphate, although scarcely water-soluble, is readily soluble in salt containing media. Thus, a corresponding formulation may be satisfactorily stable in water while in salt water or in aqueous solutions containing sulfur dioxide the above components are increasingly leached out of the formulation.

One advantage of conventional intumescent systems is that the occurring decomposition reactions are endothermic. This causes the formation of the protective layer to proceed in a directly proportional relationship to the available amount of energy. Thus the formation of the foam layer is determined by the fire regime and is not independent thereof.

It has been attempted to overcome the above described disadvantages of conventional intumescent systems by combining acid forming substance, carbonific and spumific in one single compound. This was achieved by Sawco and Ricetiello in 1967 (Journal of Coating Technology 49 (1977), page 624). The compositions proposed by these authors respond to rapid heat flux but are ineffective under the slower ramps of more normal fire conditions. A further disadvantage of these systems is that the reaction is partially exothermic. This provides the system with additional energy and renders the intumescence phenomena independent of the actual fire regime. Furthermore, the salts described by Sawco and Ricetiello have to be bound into a binder system. In any event, said compositions already represent a system wherein all essential functions of the conventional phosphate catalyzed system are combined into a unitary molecular structure. Since no labile groups are present in said system and all mechanisms of action are combined within one molecule, transportation phenomena do not play an important role. For example, in the reaction of conventional systems the polyol component becomes dehydrated by intermediately formed free phosphoric acid. A phosphate ester is formed as intermediate which immediately decomposes again since its decomposition temperature is lower than the reaction temperature. If the phosphate esters were already present in the initial formulation the reaction of intumescence would already start at the lower decomposition temperature of the phosphate ester and not only at the higher decomposition temperature of the ammonium polyphosphate.

When investigating a conventional intumescent system by means of thermogravimetric methods it will be found that both after applying the coating and during exposure to a fire a weight loss occurs which is shown in the following table 1 for one example.

TABLE 1

| Component | wet coating (%) | dry coating (%) | expanded carbon skeleton (%) | inflammable residue (%) |
|---|---|---|---|---|
| Solvent | 30 | — | — | — |
| Binder | 20 | 20 | 10 | — |
| Acid former | 25 | 25 | 17.5 | 17.5 |
| Carbonific | 8 | 8 | 5 | — |
| Spumific | 8 | 8 | — | — |
| Pigment | 9 | 9 | 9 | 9 |
| Total | 100 | 70 | 41.5 | 26.5 |

From table 1 it can be taken that at the end of the exposure to fire only 26.5% of the initially applied protective coating contribute to the insulating effect.

Accordingly it is an object of the present invention to provide a composition having integrated intumescent properties which avoids or at least alleviates the disadvantages of conventional intumescent systems described above.

According to the present invention it has been found that certain orthophosphate esters of carbonifying polyols which are cured with certain reactive polymers represent polymers having integrated intumescent properties. There also has been developed a process by which said orthophosphate esters can be prepared without having to take the usual synthesis route via phosphorus trichloride or phosphorus oxychloride and in which chemically and technically complicated purification steps can be avoided.

The phosphate esters employed according to the present invention are essentially those which are formed as intermediates in the reaction leading to the formation of an intumescent layer and whose decomposition results in intumescence.

Intumescent coatings on the basis of the composition of the present invention show the properties given in the following table 2 under the conditions underlying table 1 above.

TABLE 2

| Component | wet coating (%) | dry coating (%) | expanded carbon skeleton (%) | inflammable residue (%) |
| --- | --- | --- | --- | --- |
| Binder | 60 | 60 | 49 | 37.5 |
| Pigment | 40 | 40 | 40 | 40 |
| Total | 100 | 100 | 89 | 77.5 |

From table 2 it can be taken that at the end of the exposure to fire of a composition according to the present invention 77.5% of the starting materials are still present. Accordingly, the protective effect is about three times as high as with conventional systems.

An object of the present invention, therefore, is a composition having integrated intumescent properties, which composition is obtainable by combining (a) one or more amino-formaldehyde resins and (b) a mixture of optionally carboxylic acid anhydride-modified mono- and diesters of orthophosphoric acid with one or more polyols, the average hydroxyl group content of said polyols being at least 40% by weight, the monoester/diester molar ratio not exceeding 12:1 and the phosphorus content of said mixture being at least 10% by weight.

The above component (b) and the preparation thereof from polyphosphoric acid and the corresponding polyols at elevated temperature and reduced pressure also is an object of the present invention, as is the use of the above composition for coatings, especially for articles made of wood, plastic, cellulosic materials, rubber or metal,.as well as for the impregnation of textiles.

In the drawings

Figure 2:
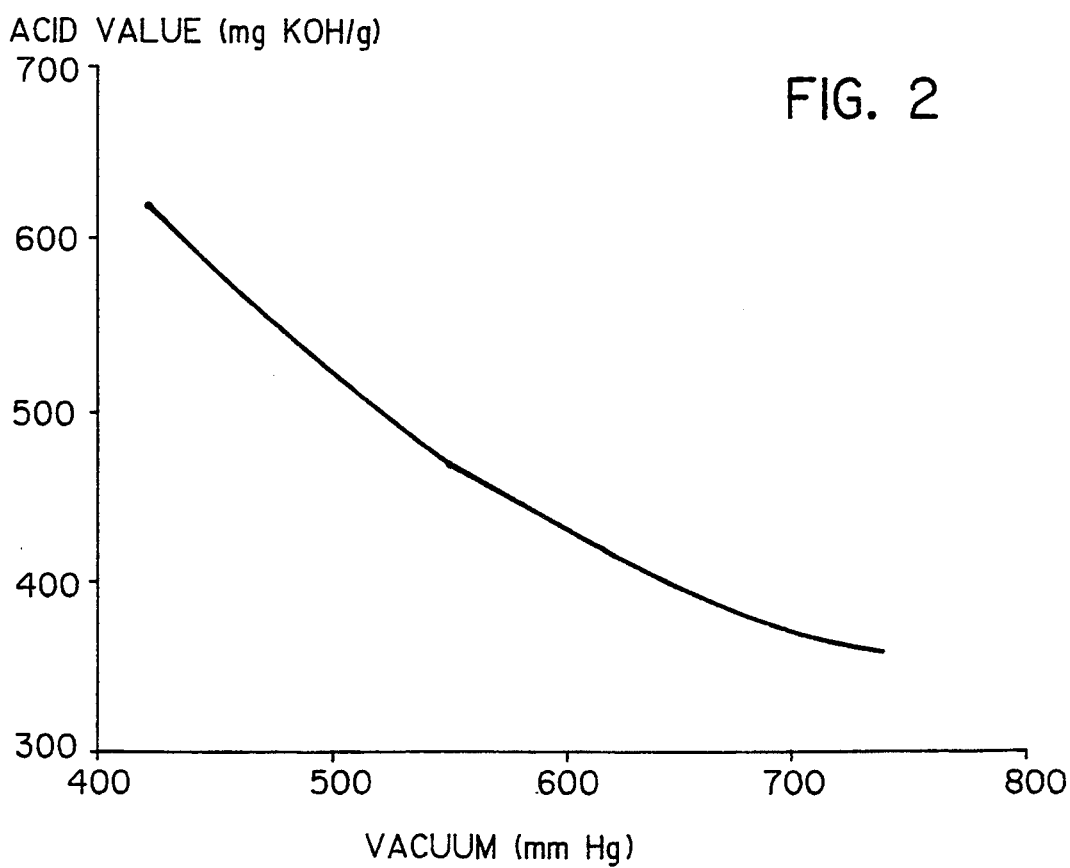

FIG. 1 represents the relationship between the acid value achieved in practice in the esterification of polyphosphoric acid (2 mol equivalents of $H_3PO_4$) with one mole of glycerol and one mole of pentaerythritol and the degree of condensation of said phosphoric acid (reaction temperature 115° C.; pressure 160 mmHg and vacuum 600 mm Hg, respectively); and FIG. 2 represents the relationship between the acid value achieved in practice and the pressure in the esterification on which FIG. 1 is based (reaction temperature 115° C.).

According to the present invention it is preferred that the molar ratio monoester/diester in the above component (b) does not exceed 6:1, and particularly does not exceed 3:1. A particularly preferred molar ratio monoester/diester is in the range of from 2:1 to 1:1.

Furthermore it is preferred that component (a) is an optionally modified melamine-formaldehyde resin and/or optionally modified urea-formaldehyde resin. The modification may consist in a conventional modification (e.g. methylation). Preferred, however, are urea- and melamine-formaldehyde resins which have been modified with aromatic glycidyl ethers and/or cycloaliphatic epoxides. Specific examples of modifiers of said type are 3,4-epoxycyclohexylmethyl-3,4-epoxycyclohexanecarboxylate and bisphenol-A-diglycidylether. Said modification increases the strength of the cured composition and in the event of fire results in an increased adhesion of the intumescent layer. Preferably, the modifiers mentioned above are used in an amount such that they account for 1 to 15% by weight of component (a).

The ratio of the amounts of component (a) and component (b) essentially depends on the desired phosphorus content of the dried and cured (crosslinked) composition. Preferably said phosphorus content is at least 8, and particularly at least 10% by weight, while a phosphorus content of 16% by weight is usually not exceeded. As already mentioned above, the minimum phosphorus content of component (b) is 10% by weight while a preferred maximum is 25% by weight of phosphorus. A particularly preferred range is from 15 to 22% by weight of phosphorus for component (b).

Furthermore it is preferred that per mole of acid functionality in component (b) there is available about one mole of methylol functionality in component (a).

The above component (b) is preferably derived from at least 2 and particularly from 2 to 4 polyols. The average hydroxyl group content of said polyols (calculated as molecular weight of the hydroxyl groups divided by the total molecular weight of the polyols times 100%) is at least 40% by weight and preferably at least 45, particularly at least 47% by weight. However, it is not mandatory that each individual polyol in said polyol mixture has a hydroxyl group content of at least 40% by weight. On the contrary, one or more polyols having a hydroxyl group content of less than 40% by weight can be employed in said polyol mixtures, preferably not more than 15% by weight of all polyol hydroxyl groups present being derived from such polyols. Naturally a hydroxyl group content of a polyol present which is too low (<40% by weight) has to be compensated by the presence of polyols having a correspondingly higher hydroxyl group content.

Preferred examples of polyols having a hydroxyl group content of less than 40% by weight are aromatic polyols such as bisphenol-A and hydroxyl group containing polymers, particularly styrene-allyl alcohol-copolymers.

Even in the case of the presence of higher molecular weight polyols it should, however, be ensured, that the polyol mixture is liquid in the temperature range of from 100° to 150° C. (the preferred temperature range for the preparation of component (b)) although this is not an indispensible requirement.

According to the present invention polyols the employment of which is particularly preferred, are polyols having 2 to 12, particularly 2 to 6 carbon atoms. Specific examples of said polyols are glycerol, trimethylol propane, pentaerythritol, inositol, ethane diol and propane diol. Other suitable compounds are sugars, particularly mono- and disaccharides.

The above mixtures of partial phosphate esters may be modified to advantage with aromatic and/or aliphatic carboxylic acid anhydrides. Said modification results in an improved water resistance of the coating and in the formation of a more stable intumescent layer in the case of exposure to fire. Particularly suitable carboxylic acid anhydrides are those which contain carbon 6-ring fragments of formula $C_6R_4$ and $C_6R_{10}$ respectively, wherein the groups R may be the same or different and represent hydrogen, halogen (particularly fluorine and chlorine) or methyl. Specific examples of said carboxylic acid anhydrides are phthalic anhydride and cyclohexane-1,2-dicarboxylic acid anhydride as well as the partially or completely fluorinated/-chlorinated derivatives thereof. In the above modification the carboxylic acid anhydride is preferably employed in amounts such that it accounts for 10 to 20% by weight of component (b). In the case of phthalic anhydride an amount of about 15% by weight is particularly preferred.

In view of the preparation of component (b) according to the present invention described below, the ester mixtures according to the present invention preferably contain additionally hydroxyl group containing polysiloxanes and/or surfactants and wetting agents, respectively, preferably fluorinated wetting agents, in conventional amounts. Polysiloxane and surfactant can also be combined in one single compound. Said components facilitate the removal of the condensation water formed during the esterification reaction described below by forming a hydrophobic medium and reducing the surface tension and, in the case of the polysiloxane, also result in a cured final product which is a more stable intumescent coating with better adhesion to the substrate.

Any hydroxyl group containing polysiloxane which is soluble or dispersable in the medium of the esterification reaction described in more detail below and whose hydroxyl groups are reactive with phosphoric acid can be employed. Preferably the total amount of $SiO_2$ in the cured composition which results from such polysiloxanes should, however, not exceed 2% by weight since otherwise the intumescent coating becomes relatively rigid. Specific examples of preferred polysiloxanes are dihydroxy functional methyl siloxanes, e.g., type LA 157 (Th. Goldschmidt). Solid siloxane types (e.g. type Z 8018 by Dow Corning) may also be employed in case compact coating films showing reduced intumescence are desired.

In principle all surfactants and wetting agents which are sufficiently stable in the respective reaction mixture and which reduce the surface tension may be employed. This applies particularly to fluorinated phosphate esters, e.g., type Fluo-wet PP (Hoechst). Said products are preferably added to the polyphosphoric acid employed for the preparation of the mixture of phosphate esters prior to the combination thereof with the polyol. Non-reactive fluorinated wetting agents such as Fluorad 431 (3M) may also be used.

Although the compositions of the present invention as such result in intumescence it may be advantageous under certain circumstances to incorporate additional spumific in the composition, e.g., in order to increase the rising rate of the intumescent layer or to decrease the density thereof. Particularly preferred spumifics, usually employed in amounts of up to 20% by weight, referred to the ester mixture, are nitrogen-containing spumifics such as urea, melamine and derivatives thereof.

Conventional fillers and/or pigments may also be added to the compositions according to the present invention, the total amount thereof usually not exceeding 5 to 50, particularly 10 to 40% by weight of the total weight of the cured composition.

As fillers and pigments all substances which are employed in conventional intumescent compositions and which preferably are of mineral (inorganic) nature are suitable. Examples thereof are pigments such as titania and carbon black, silicates, such as aluminum silicate, and mineral fibers, such as asbestos. The fillers/pigments may be added to component (a) and/or component (b) before combining said components or thereafter; preferably the addition is carried out before combining components (a) and (b).

The compositions according to the present invention are preferably present in a form suitable for coating and impregnation purposes, respectively i.e., for example in aqueous or water-containing solution or dispersion. The water, content of the composition depends on the amount and the nature of the components employed, but preferably is not higher than 60% by weight of the total composition including water. The water content of component (a) before combination thereof with component (b) preferably ranges from 20 to 40% by weight, depending on the intended application, whereas the water content of component (b) preferably ranges from 25 to 90% by weight.

The compositions according to the present invention are preferably employed for the coating of articles made of wood, plastic (including plastic composites and plastic foams), cellulosic materials, rubber and metal and for the impregnation of textiles. The application of the composition may be carried out according to any conventional method, e.g. by spraying, dipping, drawing and brushing. The coating process may optionally be repeated several times. The coating thickness may vary within a wide range, depending on the viscosity of the composition and the substrate to be coated. Conventional coating thicknesses range from 10 $\mu$m to 3 mm.

The curing of the composition (the coating) is preferably carried out at room temperature, although said curing can also be carried out at elevated temperatures (preferably up to about 60° C.), depending on the nature of the components employed.

The mixture of esters employed as component (b) for the production of the composition according to the present invention may be prepared according to the present invention by a process which starts from polyphosphoric acids (optionally in admixture with $P_2O_5$) which are reacted, at elevated temperature and reduced pressure, with effective removal of the water formed during esterification (preferably under vigorous stirring), with the polyol(s) in a molar ratio suitable for achieving the required ratio monoester/diester.

A preferred process for the preparation of the mixture of partial phosphate esters (b) may be summarized as follows:

1. A polyol mixture which is liquid in the temperature range of from 100° to 150° C. and which has an average hydroxyl group content of at least 40% by weight is placed in a vacuum tight stirring vessel made of inert material which vessel is equipped with a controllable heating device.

2. To this polyol mixture there is added, under reduced pressure (preferably 160 mm Hg at the most), vigorous stirring and temperature control, polyphosphoric acid at a rate such that a local excess of acid is avoided and the concentration of free, non-esterified acid in the reaction mixture is kept at a relatively low level.

3. Upon addition of all of the polyphosphoric acid stirring is continued under constant vacuum and constant temperature until the acid number of the mixture assumes a constant value.

The reaction product thus obtained is a viscous, more or less colored mass. This so-called prepolymer may be further used in this form or, if necessary or desired, may be further purified, e.g. by treatment in a thin film evaporator, whereby a further esterification under release of water occurs.

A further purification method consists in the azeotropic dehydration. For this purpose the prepolymer is dissolved in a solvent capable of forming an azeotrope with water, preferably methylisobutylketone. The solution is refluxed and the redistillate is reintroduced into the distillation flask via a suitable desiccant.

The factor most important for the successful implementation of the above reaction is the as early and effective as possible removal of the water-formed during the esterification reaction since otherwise orthophosphoric acid is preferably formed under hydrolysis from the polyphosphoric acid said orthophosphoric acid being hard to esterify under the reaction conditions and catalyzing the decomposition (hydrolysis) of already formed ester.

The preferred reaction temperature for the above reaction ranges from 115° to 130° C., while the reduced pressure preferably is 70 mbar or below. As already mentioned above the reaction is preferably carried out in the presence of polysiloxanes and/or surfactants (wetting agents) which facilitate the removal of the condensation water formed in the reaction mixture by forming a hydrophobic medium and reducing the surface tension.

The polyphosphoric acids employable in the above reaction may show any degree of condensation, provided that they are present in liquid or finely divided form, readily dispersable under the reaction conditions described. In the calculation of the required amount it is to be assumed that pyrophosphoric acid corresponds to 105% of orthophosphoric acid and tetraphosphoric acid corresponds to 117.5% of orthophosphoric acid. Phosphorus pentoxide corresponds to 138% of orthophosphoric acid.

The achievable acid number depends on the degree of condensation of the polyphosphoric acid employed. For the reaction of 2 mole equivalents of orthophosphoric acid in form of polyphosphoric acid, one mole equivalent of pentaerythritol and one mole equivalent of glycerol, the achievable acid number in relation to the degree of condensation of the polyphosphoric acid employed is represented in FIG. 1.

According to the present invention it has also been found that only a maximum of 50% of the phosphoric acid required may be derived from phosphorus pentoxide since otherwise decomposition reactions occur. Although it is known that triesters of orthophosphoric acid may be obtained directly by reaction of phosphorus pentoxide with mono- and difunctional alcohols, with carbonifying polyols which are characterized by their hydroxyl group content as described above, said reaction proceeds further with dehydration to yield char.

The final value of the acid number under the given conditions also depends on the vacuum employed, as is shown in FIG. 2. It is important that the whole reaction mixture is exposed to the vacuum. Effective stirring and good mixing are advantageous in order to expose the reaction mixture with a large and continuously renewing surface to the vacuum.

The reaction mixtures described in the following examples may be heated beyond the end point of the reaction. In this case, however, the amount of decomposition products increases.

The course of reaction my be monitored in terms of the acid number. Since each polyphosphoric acid employed will be hydrolyzed to orthophosphoric acid, the course of the reaction may be controlled by determining the acid number and the number of esterified acid functionalities of the orthophosphoric acid.

The acid number may be determined by titration with potassium hydroxide. The first of the acid functionalities is always reacted to form an ester. The degree of esterification of the phosphoric acid may be defined by the relation between 1st and 2nd acid functionalities. If orthophosphoric acid is titrated against a strong base such as potassium hydroxide the neutralization of each of the functionalities is indicated by an end point in the titration curve at 3 discrete pH values. Said values are at pH 4.5, 9.0 and 13.0.

As acid functionalities are esterified then the remaining functionalities become increasingly stronger acids. Thus, a monoester has equivalence points at pH 4.5 and 9.0, respectively, whereas a diester has an end point at pH of 4.5.

If a mixture of mono- and diesters of orthophosphoric acid is titrated, the ratio monoester/diester can thus be determined by means of the equivalence point at pH 9.0. A monoester contributes 50% to each of said equivalence points (pH 4.5 and 9.0). The equivalent amount required for the first end point will therefore account for half of the total amount consumed up to the second end point. According to the present invention such mixtures of partial phosphate esters may be employed which for the first end point show more than 52% of the total amount consumed up to the 2nd end point (i.e., the molar ratio monoester/diester does not exceed 12:1). At lower values the resulting coatings are hygroscopic and sticky but water-soluble.

The acid number and the ratio monoester/diester serve to determine the progress of the reaction and the efficiency of the preparation method with respect to the desired end products. A particularly preferred molar ratio monoester/diester is 1:1, equivalent to a titration of 67% of the total amount consumed at the first end point of the titration.

The decomposition which is accompanied by a color change of the product is characterized by a decrease of the ratio of first and second acid functionalities from a maximum for the given synthesis system down to 50%.

Since the achievable maximum value of the ratio diester/monoester is 2:1, further purification methods are available for achieving said maximum value, e.g., circulating thin film evaporation in vacuum. This process may be carried out until the physical properties, particularly the viscosity, of the prepolymer prevent a further thin film evaporation.

If at the reaction temperature the chosen polyols, e.g. styrene-allyl alcohol-copolymers, will not form a liquid reaction mixture, the above prepolymers may be prepared by azeotropic dehydration. As already mentioned above said process is also suitable for reducing the acid number of other prepolymers.

The following examples are to illustrate the present invention without, however, limiting the scope thereof.

EXAMPLE 1

This example illustrates a simple preparation of a composition having integrated intumescent properties.

Into a 1 liter round bottom flask equipped with anchor stirrer, a vacuum line (achievable reduced pressure 160 mmHg or less), a heating mantle with temperature control, a dropping funnel and a powder funnel, 184 g of glycerol are introduced through the powder funnel. The heating device is set at 140° C. Pentaerythritol, 272 g, is then added to the hot, slowly stirred glycerol. At about 145° C. and under vacuum, water is eliminated from the polyol mixture for about 0.5 hours. Upon cooling to 115° C. and adjusting the temperature at this value, 338 g of commerical tetraphosphoric acid are added under vigorous stirring (about 1000 rpm) and at a rate such that the temperature inside the reactor does not exceed 115° C. Upon addition of the entire tetraphosphoric acid the reaction mixture is kept at 115° C. and under vacuum for a further 4 hours. The progress of the reaction is determined by monitoring the acid value which at the end of the reaction has dropped to a constant value of about 440 mg KOH/g.

The flask is discharged and the contents thereof are cooled to about 100° C.

Preparation of Intumescent Coatings

The product obtained above is formulated with water into a 50% solution. To 100 g of said solution 32.5 g of urea-formaldehyde resin solution (type BT 970, produced by British Industrial Plastics) are added. The resulting mixture is applied on wood and upon curing at room temperature for about 24 hours yields a clear varnish with good adhesion. The curing may also be carried out at a maximum temperature of 60° C. The pot life of the composition is 25 minutes at the most. The mixture may be applied with a brush or may be sprayed. Above 120° C. the coating forms an intumescent protective layer without formation of smoke gases.

Impregnation of Textile Materials

A 25% aqueous solution is made of the product obtained above. A total of 100 g of said solution is mixed with 16.25 g of the above urea-formaldehyde resin. A cloth is steeped in this solution and subsequently removed therefrom. Excess solution is squeezed off by means of a rubber roller. The coating is cured at about 60° C. The cloth thus treated is slightly stiffer than before the treatment but still shows textile character. Textile materials thus impregnated are resistant to ignition even though intumescence is hardly visible. The good insulating effect is, however, evident upon exposure to fire and monitoring the back face temperature.

EXAMPLE 2

This example illustrates the use of fluorinated wetting agents, polysiloxane modification, the partial use of phosphorus pentoxide in the synthesis procedure and epoxide modification of the amino-formaldehyde-resin.

The reaction vessel employed in example 1 is charged with 184 g of glycerol, 272 g of pentaerythritol and 60 g of fluorinated surfactant (Fluorad FC 405, produced by 3M). The fluorinated surfactant is a fluorine-modified hydroxyl group containing polysiloxane in the form of a 2% ethanolic solution. The ethanol is removed by applying a vacuum prior to the reaction. (The hydroxyl group containing polysiloxane and the fluorinated surfactant do not necessarily have to be present in the form of a single compound.)

Under the same conditions as described in example 1, 169 g of tetraphosphoric acid are added. Upon completion of the addition of tetraphosphoric acid the temperature of the mixture is lowered to 100° C., whereupon 105 g of phosphorus pentoxide are added at a rate such that the temperature of the mixture does not exceed 115° C. Upon complete addition of the phosphorus pentoxide the reaction mixture is kept at 115° C. and under vacuum until the acid number has dropped to a constant value below 380 mg KOH/g.

The reaction product is then converted into a 50% aqueous solution for further use.

Additionally, 20% of a cycloaliphatic epoxide (3,4-epoxycyclohexylmethyl-3,4-epoxycyclohexane carboxylate, commercially available under the trade name ERL 4221 from Union Carbide Corporation) are added to a 60% aqueous solution of a commercial melamine-formaldehyde resin (type BT 427; British Indusstrial Plastics). An amount of 39 g of the resin solution thus prepared is mixed with 100 g of the above aqueous prepolymer solution. The resulting mixture may be used for coating wood and primed metal panels. The pot life thereof is about 30 minutes. Upon curing in air at room temperature or at not more than 60° C., a hard, not sticky, water-insoluble clear varnish with intumescent properties is formed. If used in higher dilution said formulation may also be employed for rendering textile materials flame-resistant according to the procedure described in example 1, the fabric thereby retaining its textile character.

EXAMPLE 3

The apparatus described above is charged with 124 g of ethane diol, 272 g of pentaerythritol, 0.5 g of Fluorad FC 481 (3M) and 10 g of LA 157 (Th. Goldschmidt).

Fluorad FC 481 is a fluorinated surfactant, while LA 157 represents a hydroxy-functional polysiloxane.

To the above mixture, 335 g of tetraphosphoric acid are slowly added under stirring, not allowing the temperature of the reaction mixture to exceed 100° C. Upon addition of the entire acid, the temperature is raised to 115° C. and the reaction mixture is kept at this temperature and under vacuum until the acid value has assumed a constant value below 494 mg KOH/g.

A 50% aqueous solution is prepared from the prepolymer thus obtained.

Additionally a 60% solution is prepared from a melamine-formaldehyde resin (type BT 427, British Industrial Plastics). Said solution is modified with a cycloaliphatic epoxide in the same manner as described in example 2.

To 100 g of the aqueous solution of the prepolymer prepared above, 45 g of modified resin solution are added. With the resulting mixture wood and primed metal panels may be coated. The pot life thereof is about 30 minutes. Upon curing of the coating in air at room temperature or at a maximum of 60° C., a hard, non-sticky, water-insoluble clear varnish is obtained. In the case of a fire the coating thus obtained acts as intumescent varnish which protects the substrate.

For the coating of structural steel the following formulation may be used:

| Composition A | |
| --- | --- |
| Prepolymer as prepared above | 50 g |
| Water | 47 g |
| Titanium dioxide (rutile type) | 3 g |
| Composition B | |
| Resin (BT 427) | 19 g |
| Epoxide (ERL 4221) | 9 g |
| Water | 11 g |
| Aluminum silicate (Ketjensil SM 405; Akzo) | 9 g |
| Mineral fiber | 2 g |

Two parts of composition A are mixed with one part of composition B. With the resulting material primed steel (panels or supports) may be provided with an intumescent coating of a thickness of up to 2 mm. Said coating will completely cure overnight at ambient temperature.

If a sample coated in the above manner is subjected to a fire test with a temperature curve according to BS 476, Part 20, considerably better values are found with respect to the temperature increase of the substrate in comparison to conventional phosphate catalyzed systems at the same dry film thickness.

The coating obtained according to the above process is hard, flexible and glossy as well as resistant to water and moisture. Such coatings may be applied on wood at dry film thicknesses of 50 to 60 μm, thereby obtaining a hard, glossy and decorative protective coat.

EXAMPLE 4

This example illustrates the modification of the mixture of partial phosphate esters with carboxylic acid anhydride.

The apparatus described in example 1 is modified so that a reflux distillation is possible. Moreover, the possibility of withdrawing samples of the condensate is provided for. The vacuum line should be connected to the condenser.

The reactor is charged with 87 g of ethane diol, 76 g of 1,3-propanediol, 82 g of pentaerythritol and 90 g of 1,4-butane diol. Under slightly reduced pressure (800 mbar) 335 g of tetraphosphoric acid are slowly added. Upon completion of the addition of the acid, the mixture is heated to 130° C. and the pressure is reduced so that the reaction mixture is under slight reflux. The boiling point of the mixture rises gradually. Once the reaction mixture boils at 130° C. and about 200 mbar, only water can be found in the condensate, which water may simply be identified by determining the density or the refractive index of the condensate. Then the apparatus is converted into the form described in example 1. As soon as in the above described titration, 60 to 62% of the total amount of base are consumed at the first end point, 133 g of phthalic anhydride are added to the reaction mixture. Upon dissolution of the phthalic anhydride the vacuum distillation is continued as described until the ratio of the end points of the titration is not higher than by 1% in comparison to the ratio prior to the addition of the phthalic anhydride. This partial phosphate ester modified with aromatic groups may be used for the preparation of intumescent coatings for steel by reacting it with melamine-formaldehyde resin as described in example 1. In this case the epoxide modification of the melamine-formaldehyde resin may be dispensed with. The cured coating shows a considerably improved resistance to moisture and is converted to a rigid intumescent layer upon exposure to fire.

EXAMPLE 5

According to the procedure of example 1 a prepolymer is prepared, the molar ratio orthophosphoric acid:-glycerol:pentaerythritol being equal to 2:0.75:0.75.

A 500 ml round bottom flask is provided with a Soxhlet apparatus. A stirrer, preferably an anchor stirrer which keeps the contents of the flask in constant agitation and sweeps the lower walls of the flask, is employed. The flask is heated. The Soxhlet apparatus is provided with a desiccant and a condenser is connected thereto. The flask is charged with 280 g of the above prepolymer whereupon 140 g of styrene-allyl alcohol-resin (Monsanto RJ 100), dissolved in 140 g of methyl isobutyl ketone (MIBK) are added. The stirrer is started and the mixture is refluxed for 4 hours, the MIBK passing through the desiccant for dehydration purposes.

Then the Soxhlet apparatus and the condenser are removed and replaced by a vacuum distillation apparatus. The MIBK is distilled off in a manner such that the temperature of the prepolymer does not exceed 115° C. As final product, a water-insoluble, soft, slightly pink colored product is obtained. This product will form a clear, hard coating with urea- and melamine-formaldehyde resins, as described in the above examples. Said coatings show far less intumescence than the coatings of the preceding examples but are also inflammable and do not emit smokes. They may be used for clear varnishes and coatings for e.g. wood.

The procedure just described may also be employed as alternative to the purification method in a column as described above for lowering the acid value in the thin film evaporator.

I claim:

1. Composition having integrated intumescent properties, obtained by combining
   (a) one or more amino-formaldehyde resins and
   (b) a mixture of optionally carboxylic acid anhydride-modified mono- and diesters of orthophosphoric acid with one or more polyols, the average hydroxyl group content of said polyols being at least 40% by weight, the molar ratio monoester/diester not exceeding 12:1 and the phosphorus content of said mixture being equal to at least 10% by weight.

2. Composition according to claim 1, characterized in that component (a) is selected from melamine-formaldehyde resin, urea-formaldehyde resin and mixtures thereof.

3. Composition according to claim 1, characterized in that the phosphorus content thereof after curing is at least 8% by weight.

4. Composition according to claim 1, characterized in that the component (b) is a mixture of optionally carboxylic acid anhydride-modified mono- and diesters of orthophosphoric acid with at least two polyols.

5. Composition according to claim 4, characterized in that each polyol has a hydroxyl group content of at least 40% by weight.

6. Composition according to claim 4, characterized in that one or more polyols have a hydroxyl group content of less than 40 percent by weight and not more than 15 percent of all polyol-hydroxyl groups are derived from polyols having a hydroxyl group content of less than 40 percent by weight.

7. Composition according to claim 1, characterized in that the polyols are selected from aliphatic and cycloaliphatic polyols having 2 to 12 carbon atoms.

8. Composition according to claim 7, characterized in that the polyols have 2 to 6 carbon atoms.

9. Composition according to claim 7, characterized in that the polyols are selected from glycerol, trimethylol propane, pentaerythritol, inositol, ethane diol, propane diol and mixtures thereof.

10. Composition according to claim 7, characterized in that hydroxyl group containing polymers and/or aromatic polyols are additionally employed as polyols.

11. Composition according to claim 1, characterized in that component (b) said mixtures of mono- and diesters of orthophosphoric acid is modified with aromatic and/or aliphatic carboxylic acid anhydrides.

12. Composition according to claim 11, characterized in that the carboxylic acid anhydrides contain carbon 6-ring fragments of formula $C_6R_4$ and $C_6R_{10}$ respectively, wherein the groups R are the same or different and represent hydrogen, halogen or methyl.

13. Composition according to claim 1, characterized in that it additionally contains nitrogen-containing expanding agents.

14. Composition according to claim 13, characterized in that the nitrogen-containing expanding agent is selected from urea, melamine, and mixtures thereof.

15. Composition according to claim 1, characterized in that it additionally contains hydroxyl-group containing polysiloxanes and/or fluorinated surfactants.

16. Composition according to claim 15, characterized in that the polysiloxanes are present in an amount such that the $SiO_2$ content of the dried and cured composition resulting therefrom does not exceed 2% by weight.

17. Composition according to claim 2, characterized in that the resins (a) are modified with aromatic glycidyl ethers and/or cycloaliphatic epoxides.

18. Composition according to claim 1, characterized in that it additionally contains fillers and/or pigments.

19. Composition according to claim 18, characterized in that the fillers and/or pigments are selected from mineral substances.

20. Mixture of partial phosphate esters, characterized in that said mixture is a mixture of mono- and diesters of orthophosphoric acid with one or more polyols, optionally modified with carboxylic acid anhydrides, the average hydroxyl group content of said polyols being at least 40% by weight, the molar ratio monoester/diester not exceeding 12:1 and the phosphorus content of the ester mixture being equal to at least 10% by weight.

21. Mixture according to claim 20, characterized in that it is a mixture of mono- and diesters of orthophosphoric acid with at least two polyols, optionally modified With carboxylic acid anhydrides.

22. Mixture according to claim 21, characterized in that each polyol has a hydroxyl group content of at least 40% by weight.

23. Mixture according to claim 21, characterized in that one or more of the polyols have a hydroxyl group content below 40% by weight and not more than 15% of all polyol hydroxyl groups are derived from such polyols.

24. Mixture according to claim 20, characterized in that the polyols are selected from aliphatic and cycloaliphatic polyols having 2 to 12 carbon atoms.

25. Mixture according to claim 24, characterized in that the polyols have 2 to 6 carbon atoms.

26. Mixture according to claim 24, characterized in that the polyols are selected from glycerol, trimethylol propane, pentaerythritol, inositol, ethane diol, propane diol and mixtures thereof.

27. Mixture according to claim 24, characterized in that additionally hydroxyl group containing polymers and/or aromatic polyols are employed as polyols.

28. Mixture according to claim 20, characterized in that said mono- and diesters of orthophosphoric acid are modified with aromatic and/or alicyclic carboxylic acid anhydrides.

29. Mixture according to claim 28, characterized in that the carboxylic acid anhydrides contain carbon 6-ring fragments of formula $C_6R_4$ or $C_6R_{10}$, respectively, wherein the groups R may be the same or different from each other and represent hydrogen, halogen or methyl.

30. Mixture according to claim 20, characterized in that it additionally contains nitrogen-containing expanding agents.

31. Mixture according to claim 30, characterized in that the nitrogen-containing expanding agent is selected from urea, melamine, derivatives of said compounds and mixtures thereof.

32. Mixture according to claim 20, characterized in that it additionally contains hydroxyl group containing polysiloxanes and/or fluorinated surfactants.

33. Process for the preparation of the mixture according to claim 20, characterized in that it comprises the reaction of polyphosphoric acid with the polyol(s) at elevated temperature and reduced pressure.

34. Process according to claim 33, characterized in that the reaction is carried out at a temperature of from 100° to 150° C.

35. Process according to claim 33, characterized in that the reaction is carried out at a pressure of 160 mm Hg or less.

36. Coated materials, characterized in that the coating comprises a cured composition according to claim 1.

37. Composition according to claim 1, which is dissolved or disbursed, respectively, in water or a water-containing medium.

38. Method of producing intumescent coatings, characterized by combining the component of claim 1 with at least one other coating component to prepare a coating composition.

39. Method of providing articles made of wood, plastics, cellulosic materials, rubber, metal and textile materials with an intumescent coating, comprising coating said articles with a coating composition comprising the composition of claim 1.

40. Method of providing articles made of wood, plastics, cellulosic materials, rubber, metal and textile materials with an intumescent impregnation, comprising impregnating said articles with a composition comprising the composition of claim 1.

41. Method of producing coating compositions having integrated intumescent properties, comprising preparing a coating composition by combining at least one coating composition component with the mixture according to claim 20 as an essential component of said coating composition.

* * * * *

UNITED STATES PATENT AND TRADEMARK OFFICE
CERTIFICATE OF CORRECTION

PATENT NO. : 5,387,655
DATED      : February 7, 1995
INVENTOR(S): Charles D. ASLIN It is certified that error appears in the above-indentified patent and that said Letters Patent is hereby corrected as shown below:

On the title page, Item [30], the PCT information was omitted from the Foreign Application Priority Data. It should read:

--Nov. 27, 1991 [WO] WO......PCT/EP91/02247--

Signed and Sealed this

Twenty-fifth Day of April, 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,387,655  
DATED : February 7, 1995  
INVENTOR(S) : Charles D. ASLIN Page 1 of 2

It is certified that error appears in the above-indentified patent and that said Letters Patent is hereby corrected as shown below:

Column 1, line 36, please delete "," after the period  
       line 59, please delete "of" and insert therefor --or--.  
Column 5, line 32, please delete "." after the comma.  
Column 8, line 1, please delete "," after the word water.  
Column 9, line 3, please delete "-" after the word water.  
Column 12, line 2, please delete "Indusstrial" and insert therefor --Industrial--.  
Column 15, line 32, please delete "With" and insert therefor --with--.

UNITED STATES PATENT AND TRADEMARK OFFICE
CERTIFICATE OF CORRECTION

PATENT NO. : 5,387,655
DATED : February 7, 1995
INVENTOR(S) : Charles D. ASLIN

It is certified that error appears in the above-indentified patent and that said Letters Patent is hereby corrected as shown below:

Column 16, line 33, please delete "disbursed" and insert therefor --dispersed--.

Signed and Sealed this

Eleventh Day of June, 1996

Attest:

BRUCE LEHMAN

Attesting Officer

Commissioner of Patents and Trademarks